United States Patent [19]

Sticht

[11] Patent Number: 4,666,367

[45] Date of Patent: May 19, 1987

[54] APPARATUS FOR HANDLING A STRUCTURAL PART

[76] Inventor: Walter Sticht, Karl-Heinrich-Waggerl-Strasse 8, A-4800 Attnang-Puchheim, Austria

[21] Appl. No.: 880,350

[22] Filed: Jun. 25, 1986

Related U.S. Application Data

[63] Continuation of Ser. No. 623,484, Jun. 22, 1984, abandoned.

[30] Foreign Application Priority Data

Jun. 28, 1983 [AU] Australia .............................. 2354/83

[51] Int. Cl.⁴ ............................................ B65G 47/00
[52] U.S. Cl. ..................................... 414/751; 901/11; 901/16
[58] Field of Search ................................ 414/750–753; 901/11, 13, 16; 198/345, 463.6

[56] References Cited

U.S. PATENT DOCUMENTS

| | | | |
|---|---|---|---|
| 3,051,293 | 8/1962 | Peterson | 198/492 |
| 3,734,303 | 5/1973 | Blatt | 414/753 |
| 3,870,164 | 3/1975 | Haase | 414/753 |
| 4,005,782 | 2/1977 | Crockett | 414/753 |

FOREIGN PATENT DOCUMENTS 1134035 11/1968 United Kingdom .
555006 5/1977 U.S.S.R. .............................. 901/11

*Primary Examiner*—Joseph E. Valenza
*Attorney, Agent, or Firm*—Kurt Kelman

[57] ABSTRACT

There is disclosed a system for handling or positioning of structural parts or tools on a guide track for an intermediate carrier provided with a displacing device and a positioning device. The guide track for the intermediate carrier has its end portions mounted in carrier plates. These end plates are joined by bracing plates extending parallel to the guide track and defined by two guide posts arranged in a plane extending obliquely to the vertical.

10 Claims, 8 Drawing Figures

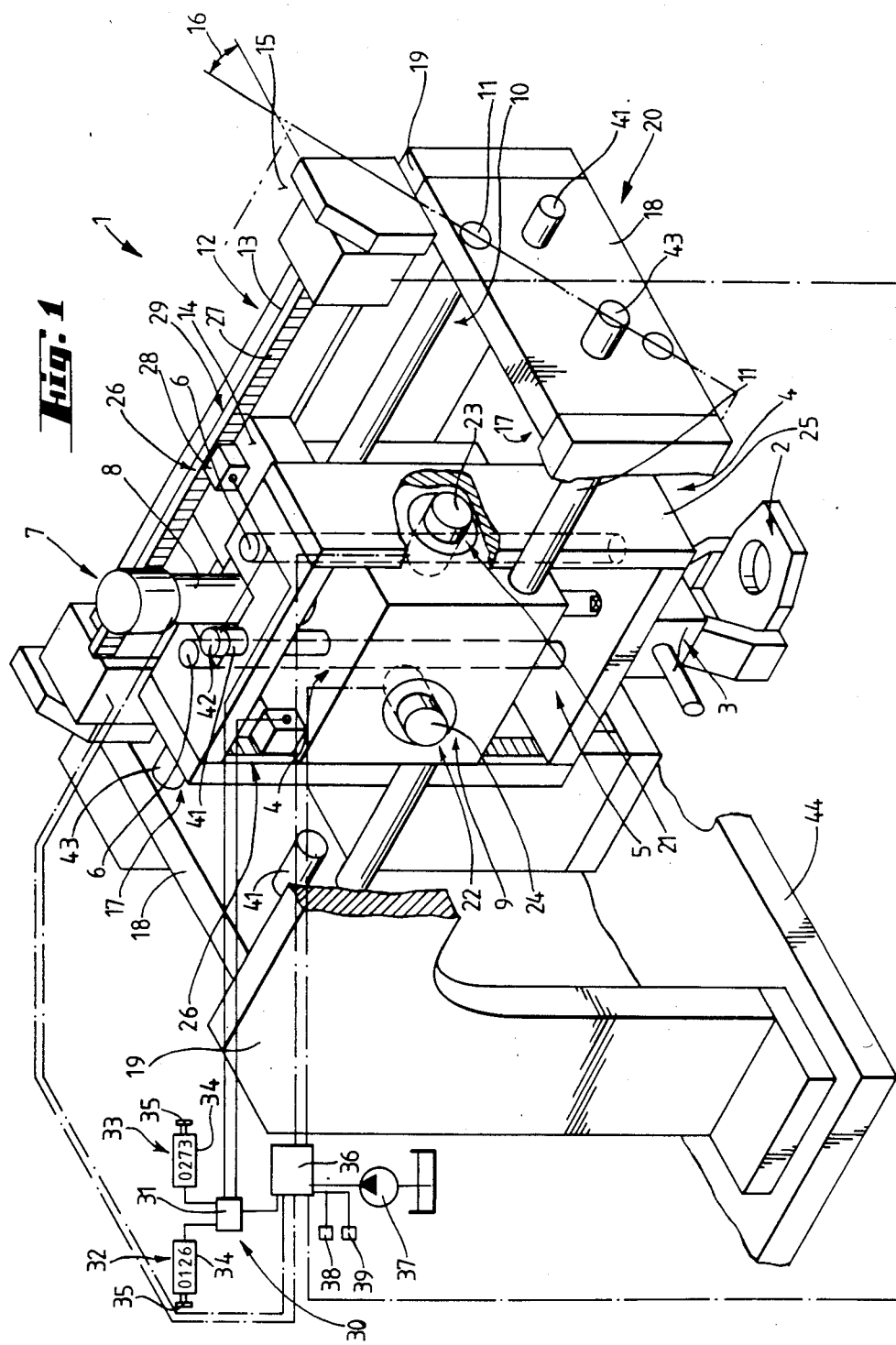

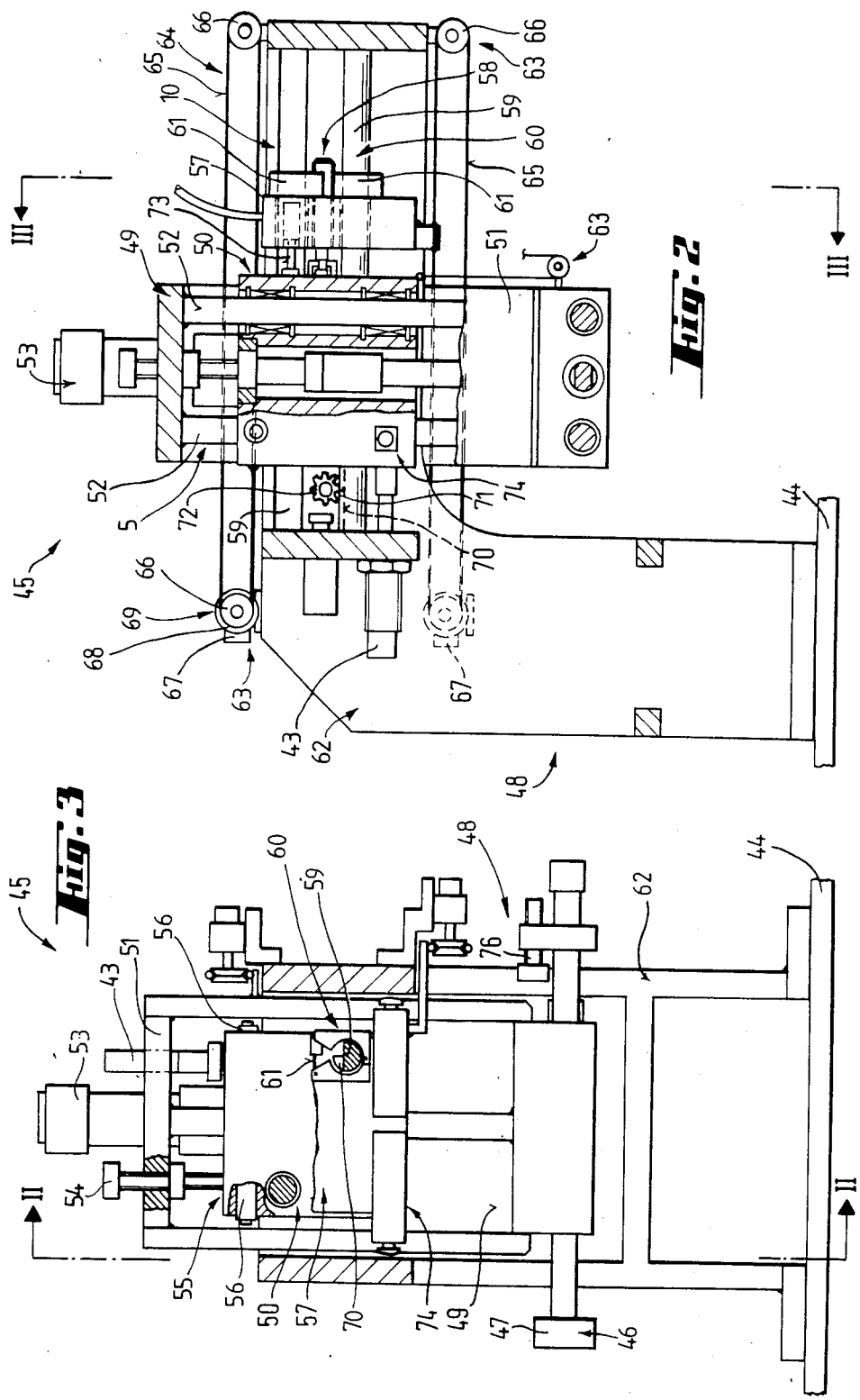

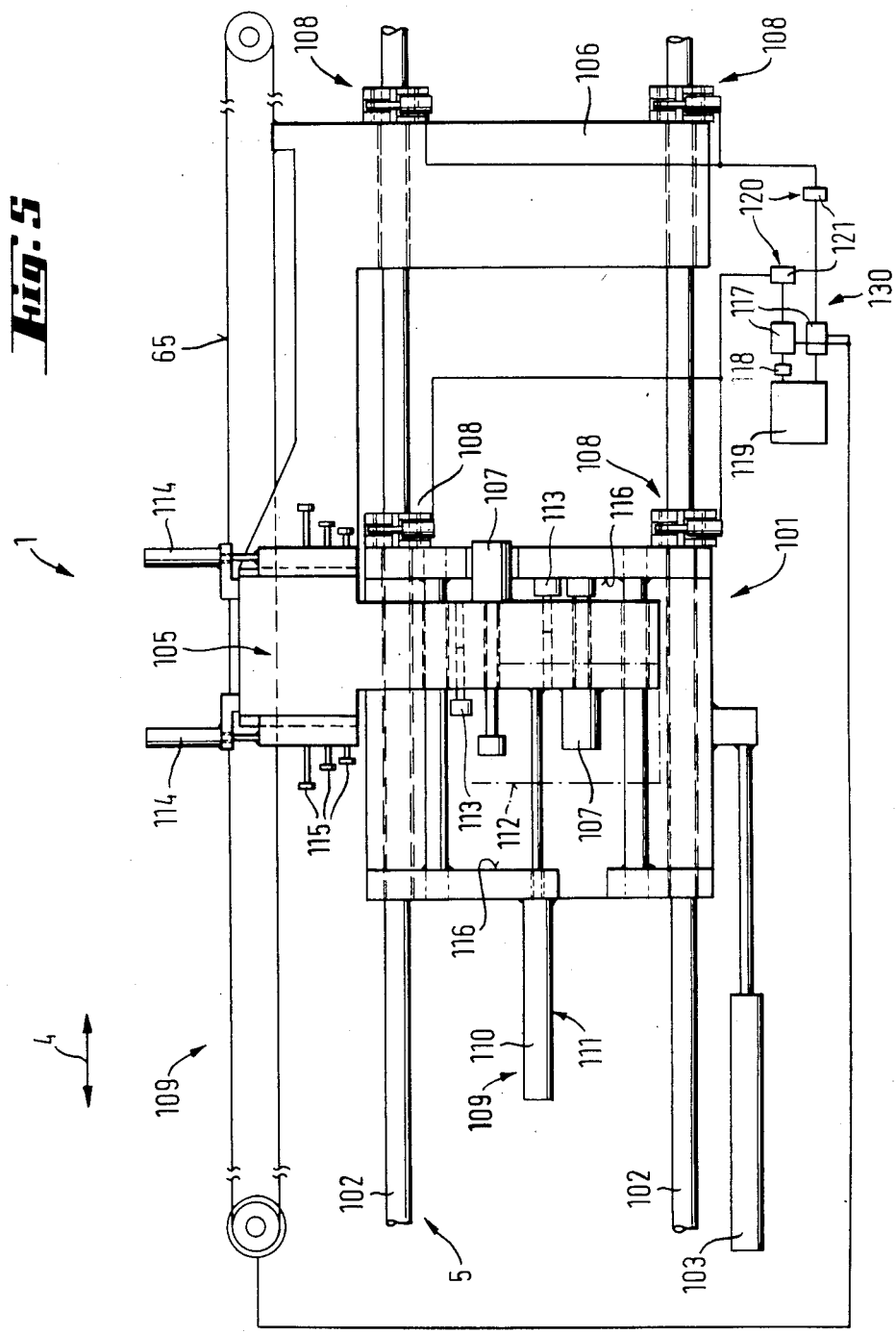

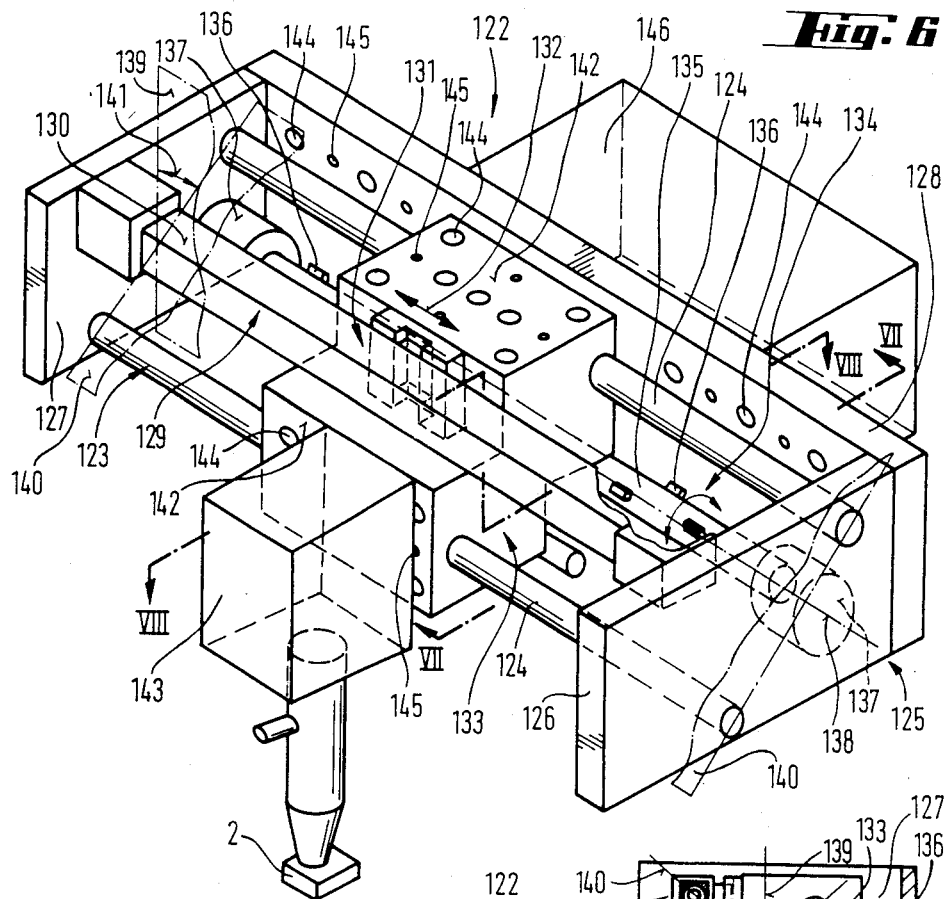
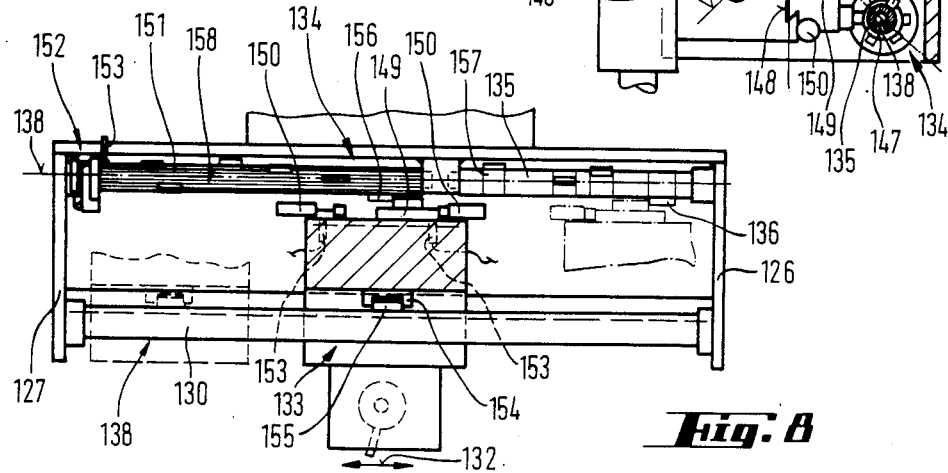

APPARATUS FOR HANDLING A STRUCTURAL PART

This is a continuation of my copending application Ser. No. 623,484, filed June 22, 1984, now abandoned.

The invention relates to an apparatus for handling and/or positioning structural parts or tools, comprising at least one guide track whereon is displaceably installed an intermediate carrier coupled to a displacing device, as well as comprising a device for detecting the position of the intermediate carrier.

A structural parts handling apparatus known from U.S. Pat. No. 4,369,872 has several rectilinear guiding tracks arrayed at angles to each other, whereby a gripper element may be displaced in several spatial directions extending angularly to each other. Mechanical terminal stops are provided to limit the displacements of the machine elements or gripper elements along the guiding tracks in the different spatial directions. If stops differently positioned in one setting are then placed in the path of displacement of the separate machine parts or gripper elements, it is possible to strike several different terminal positions with the gripper element along the longitudinal guiding track. Such component handling systems proved very satisfactory in practice since the individual positions are precisely reproducible even in the case of a large number of operating actions and large rapidly displaced weights. In many cases of application, however, the number of possible terminal positions or settings of the machine parts or gripper elements is inadequate.

Component handling systems also known as robots are known from U.S. Pat. No. 3,760,956. It is possible to reach optional positions or settings along a guide track by means of these systems. These different settings are established either by means of a continually operative device for detection of the position of the moving machine parts or gripper elements or their driving elements, or by means of limit or terminal stops displaceable along the guide track, which are intended to allow a decelerating displacement of the machine part or gripper via the drive and stopping the same at the required positon with optimum precision. These devices proved ineffective in situations in which a plurality of working actions is to be undertaken within brief periods and at high speed, since identical positions or limit settings are not reproducible with sufficient precision during successive operating cycles. Also, the costs of such systems are comparatively high.

The primary object of this invention is a system for the production or handling of structural parts or tools, wherein an intermediate carrier or handling devices may be positioned with dimensional precision at optional limit settings along a guide track. It should be possible moreover for the same positions along the guide track to be reproduced precisely even in the case of a plurality of operating actions.

This and other objects of the invention are accomplished with the guide track for the intermediate carrier having its terminal portions installed in bearing plates which are connected by a bracing beam extending parallel to the guide track and two guide posts forming the guide track and situated in a plane extending obliquely to the vertical.

Such an apparatus has the advantage that a spatial framework is formed by the arrangement of the bracing beams and guide posts rigidly attached thereto, thereby dimensionally precisely positioning and guiding the intermediate carrier and the handling devices arranged on the same, such as grippers, screwing means or the like. Furthermore, an approximately identical rigidity of the guide track is obtained in horizontal as well as vertical directions by means of the guide posts situated in an oblique plane, thereby allowing universal application of the system for handling and/or positioning, irrespective of whether the guide track is arranged in a vertical or a horizontal plane.

The above and other objects, advantages and features of the present invention will become more apparent from the following detailed description of certain now preferred embodiments thereof, taken in conjunction with the somewhat schematic drawing wherein FIG. 1 shows a perspective view of an apparatus according to the invention for handling or positioning structural parts or tools, in greatly simplified manner;

FIG. 2 shows a modified embodiment of such an apparatus, partly in side view and cross-sectioned along line II—II of FIG. 3;

FIG. 3 shows the apparatus of FIG. 2 in end view, cross-sectioned along line III—III of FIG. 2;

FIG. 5 shows a modified form of the apparatus with a central stop effective in both directions;

FIG. 6 is a view similar to that of FIG. 1 of yet another embodiment;

FIG. 7 shows the apparatus in end view, cross-sectioned along line VII—VII of FIG. 6; and FIG. 8 shows the apparatus in plan view, partially cross-sectioned along line VIII—VIII of FIG. 6.

Figure 4:
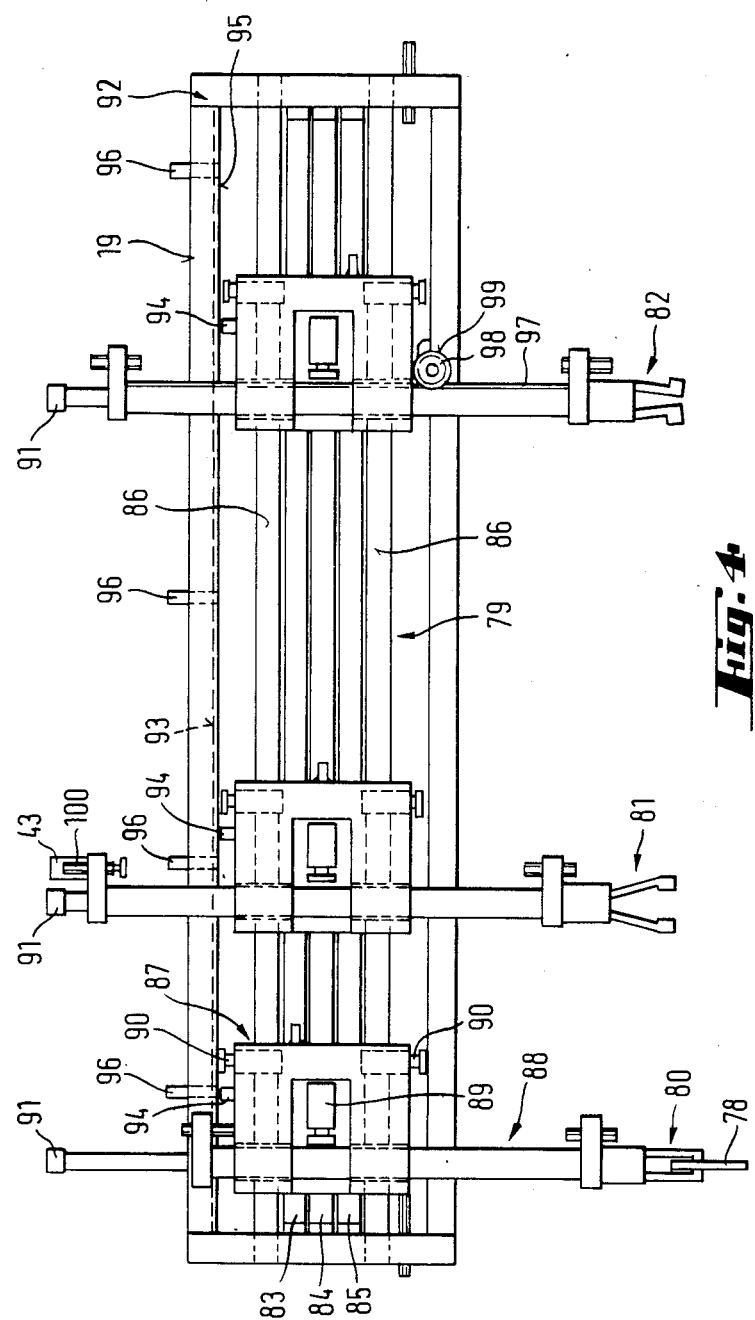
FIG. 4 shows another embodiment of such an apparatus comprising several independently displaceable intermediate carriers in a diagrammatic side view.

Apparatus 1 for handling or positioning structural parts 2 or tools is illustrated in FIG. 1. A gripper device 3 is secured on intermediate carrier 4 which is mounted displaceably along guide track 5 which is formed by rectilinear guide posts 6. A displacing device 7, which is formed by cylinder-piston device 8 operable by a pressure fluid, for example, serves the purpose of displacing intermediate carrier 4. The guide posts 6 are displaceably mounted in another intermediate carrier 9 which is displaceable along guide track 10 formed by rectilinear guide posts 11 by means of displacing device 12, e.g. cylinder-piston device 13 lacking a piston rod. The intermediate carrier 9 is connected to the movable piston of the cylinder-piston device 13 by means of entraining element 14.

The guide posts 11 of guide track 10 are situated in a plane 15 shown diagrammatically by double-dot dashed lines and sloping at an angle 16, preferably of 45°, with respect to the horizontal. This results in practically identical physical properties of the guide track 10 in the horizontal as well as vertical directions. Guide posts 11 are mounted in terminal portions 17 of guide track 10 in bearing plates 18 which are interconnected by bracing plates 19 to form a torsionally rigid bearing body 20. This box-like structure forms an inherently rigid housing so that a reliable base is available for mounting guide posts 11 in both terminal portions to produce a guide track resistant to high stresses. Thanks to this ambilateral clamping of guide posts 11, a smooth and precise guiding of intermediate carrier 9 is assured along guide track 10, and vibrations of the intermediate carrier are prevented, such as those occurring in the case of cantilevered mounting of the guide posts 11 by virtue of the different distance of the intermediate carrier from the mounting point of the guide posts, as a function of the varying bending moments.

For dimensionally precise positioning of intermediate carriers 4 and 9, they are equipped with braking devices 21, 22, the braking drives 23, 24 bearing during the braking action on bracing plates 25 and 19, respectively, of bearing body 20 and of intermediate carrier 4, respectively, acting as braking surfaces.

To allow intermediate carriers 4 and 9 to be stopped in a precise position at any optional point along the two guide tracks 5 and 10, each has allocated to it a device 26 for detecting their position. To simplify matters, the two position detecting devices 26 are shown to be of analogous nature for both intermediate carriers 4 and 9, but it is possible without departing from the invention to make use of other position detecting devices or even different devices for the separate intermediate carriers, instead of those illustrated.

In the illustrated embodiment, the position detector devices 26 bear optional markings, for example in the form of a "line code" 27, or electromagnetically active pulse traces. The position of the individual intermediate carriers 4, 9 with respect to these markings or the line code 27 is scanned by a pickup head 28 of a measuring device 29. It is assured thereby that the precise position of the two intermediate carriers 4 and 9 may be detected continuously throughout the length of the guide tracks 5 and 10.

The output signals coming from the measuring devices 29 are fed to a control device 30. In a comparator element 31, these measured values are compared to the positions preset on setting elements 32, 33 for the intermediate carriers 4 and 9. The setting elements comprise an indicator panel 34, for example, in which the momentary position, e.g. set manually by means of a rotary knob 35, is indicated digitally.

The braking drives 23, 24 of braking devices 21, 22 are operated by the pressure fluid supplied by pump 37, as a function of the weight of the intermediate carriers 4 and 9 and of their speed of travel. The feed velocity of displacing devices 7 and 12 for the intermediate carriers 4 and 9 may be reduced appropriately by setting elements 38, 39 before reaching the scheduled position or the required position, or the onset of the braking action or the increase of the braking force may be adjusted accordingly. It is assured thereby that an even deceleration of the intermediate carriers 4 and 9 is obtained without jerkiness. It is assured, moreover, that intermediate carriers 4 and 9 may be stopped precisely at the required position in each case, during frequent repetition of the same sequence of displacements. It is evidently possible to replace the manual presetting of the required position by presetting the same by means of a program emitter, for example a microprocessor, and to monitor the required position being reached by reference to indicator panels 34. So that a reliable immobilization of intermediate carriers 4 and 9 may be assured upon performing force-intensive operating actions with the gripper device 3, it is also possible, moreover, to preset the magnitude of the gripping force exerted by means of the braking drive on control element 36 by means of another setting element. The magnitude of the blocking force and thus indirectly the magnitude of the force exerted by means of the gripper device 3 may thereby be set or adjusted. Thanks to this unexpectedly uncomplicated solution consisting in the direct or indirect co-ordination of a braking device with the part whereof the kinetic energy has to be reduced for dimensionally precise stopping and positioning, manifold advantages are secured. It is thus possible to allow precise stopping along the guide track notwithstanding the weight or speed of displacement of the intermediate carrier, since the braking action may be precalibrated precisely in conjunction with the setting element for the intermediate carrier position and the device for detecting the position of the intermediate carrier or stop. This has the advantage that any play in the driving devices or driving means for the intermediate carriers has no effect on the positioning precision of the same, and that the displacement of the intermediate carrier may actually be decelerated or precisely terminated commensurately. Beyond this, the braking force or braking action of the braking device may be adapted rapidly to parts or intermediate carriers of different weight, in an uncomplicated manner, so that standard components may be utilized for the most varied cases of application.

Fixed stops 41 may, moreover, be installed along the extension of guide tracks 5 and 10 for intermediate carriers 4 and 9, especially in their terminal portions 17, 40. These fixed stops may have allocated to them detector elements 42 which are integrated in them or complementarily installed, as well as shock absorbers 43. The incorporation of fixed stops 41, which may alternatively be displaceably mounted in the corresponding carrier plates, allows the precise operation of devices 26 for detecting the position of the intermediate carriers to be verified. As a matter of fact, if intermediate carriers 4 and 9 bear against stops 41, they are situated in an unequivocally established position and a verification of the reading indicated by the devices 26 may thus occur in an uncomplicated manner. This possibility increases the precision during frequent reproduction of different positions of intermediate carriers 4 and 9 along guide tracks 5 and 10. To this end, scanner elements 42 are connected to control device 30.

As shown diagrammatically, bracing plates 19 are commonly fastened on table plate 44 of an assembling machine or a machine tool or the like.

Apparatus 45 for handling or positioning a tool 46 is shown in FIGS. 2 and 3. The tool 46 consists of press die 47 with which it is possible, for example, to press friction bushings into a bearing block. The system 45 comprises bearing body 48 which is fastened on table plate 44 of a machine table. Two intermediate carriers 49, 50 are provided for positioning the tool 46 in vertical and horizontal directions. The intermediate carrier 49 comprises a frame-like housing 51 wherein are secured guide posts 52 forming guide track 5. The guide posts 52 are displaceably mounted in intermediate carrier 50. A displacing device 53 is incorporated for displacement of intermediate carrier 49 with respect to intermediate carrier 50. A bottom limit position of intermediate carrier 49 with respect to intermediate carrier 50 is established by fixed stop 54 which has a shock absorber 43 allocated to it. Other optional positions of intermediate carrier 49 with respect to intermediate carrier 50 may be reached by co-operation of displacing device 53 with braking device 55 and its braking drives 56. The braking drives 56 then come into contact with the inner sides of housing 51 of intermediate carrier 49 and slow down the forward displacement until intermediate carrier 49 has reached the required setting or position. The actuation of displacing device 53 or of braking drives 56 may occur as described with reference to FIG. 1.

To assure smooth stopping of tool 46 at the end of a displacement in the horizontal direction along guide track 10 for intermediate carrier 50, a stop 57 is allocated to this intermediate carrier 50. This stop 57 is connected to intermediate carrier 50 via a shock absorber 58 and is displaceably mounted on guide posts 59 of guide track 10. Moreover, braking device 60 whereof the braking drives are allocated to the two guide posts 59 is situated on this stop 57. The braking devices may be allocated to the guide track and/or the carrier plates so that the decelerating forces acting during deceleration of the intermediate carriers are as unaffected by oscillation as possible even in the case of high speeds and weights.

If the intermediate carrier has allocated to it a stop displaceable along the guide track and coupled to it, or the intermediate carrier forms the stop and the braking devices are situated on the stop, it is possible to obtain precise positioning at high speed, as a function of the low stop weight in conjunction with the sensitive action of the braking device, whilst nevertheless being able to stop machine parts having a high speed and weight in positionally fixed and precise manner at optional limit positions along a guiding track.

If a decelerator device, e.g. a shock absorber, and preferably also a limit switch, is installed between the intermediate carrier and the stop, and the device for detection of the intermediate carrier position is coupled in motion with the stop and complementarily incorporates a distance measuring device situated between the intermediate carrier and the stop, the forces during deceleration and positioning are comparatively small thanks to the deceleration and positioning of the stop running ahead of the intermediate carrier. This allows of extremely sensitive positioning and at the same time of braking the intermediate carrier with a precisely preselectible characteristic.

A device 63 for detecting the position is allocated to stop 57 or to intermediate carrier 50, for establishing the position or setting of the intermediate carriers 49 and 50 with respect to each other or to the stop 57 or with respect to bearing element 62 bearing guide track 10. As an entraining element 64, the former comprises a cogged belt 65 which is trained over deflecting pulleys 66 mounted on bearing element 62. One of the deflecting pulleys 66 is coupled to a measuring device 67 which continuously monitors the displacements of the entraining element 64. If this measuring device 67 is connected by servo-motor 68 or a stepping motor to the deflecting pulley 66, the entraining element 64 may simultaneously be utilized as a displacing drive 69.

If the intermediate carrier position detector device forms the displacing device and a displacing drive preferably formed by a stepping or servo-motor co-operates with a revolving entraining element, the arrangement of the braking device renders it possible to make do with driving devices of uncomplicated form, since the decelerations of heavy machine elements, which normally cause the drives to be stressed very highly, are borne by the braking device and no longer adversely affect the drive.

It is also possible moreover for the entraining element to be formed as a strip-like element, e.g. as a cogged belt or chain or the like, and for one of the deflecting pulleys to be connected to a measuring device, e.g. a rotary potentiometer or the like. The advantage of this solution consists in that the measuring device is independent of the drive and that a precise positioning of the intermediate carriers is thus possible even during slipping actions of the drive or the like.

If the displacing device or displacing drive for the intermediate carrier is formed by a servo-motor, there is a sensible division of the accelerative and decelerative forces between the drive and the braking device. This embodiment is particularly appropriate for intermediate carriers of great weight and high speeds of displacement.

It is also possible however, as shown diagrammatically in FIGS. 2 and 3, for one of the two guide posts—being the bottom guide post 59 in the present case—to have allocated to it ratchet 70 meshing with pinion 71 of motor 72. If this motor is constructed as a stepping motor, the incorporation of the devices 63 is superfluous if a distance measuring device 73 is situated between the intermediate carrier 50 and the stop 57. The position of the fore-running stop 57 results from the position of the stepping motor and of the distance measuring device.

Thanks to the co-ordination between stop 57 and intermediate carrier 50, it is accomplished in an unexpectedly uncomplicated and effective manner that the fore-running stop of comparatively low weight may be stopped and immobilized by means of comparatively small forces and thus in precise position by means of braking drives 61, whereupon the following large weight of the intermediate carrier 50 with the intermediate carrier 49 secured thereon is braked down and stopped at the precise position, making use of the decelerating action of shock absorber 58. Control is exercised over the displacement sequences of the separate displacing drives and braking drives by means of a central control device which may for example be constructed, as illustrated in FIG. 1. If it is intended to assure smooth and rapid positioning under utilization of stops 57 in both directions of displacement of intermediate carrier 50, it is necessary to install either two symmetrically formed stops 57 or a central stop connected in an independent manner to the intermediate carrier 50 by means of symmetrically arranged shock absorbers in each case.

It is evidently possible for the illustrated devices 63 for detecting the positions of the intermediate carrier 50 or the stop 57, respectively, to be situated parallel to each other. It is possible thereby to monitor the displacements of the two parts separately and to release the braking device 60 when the intermediate carrier 50 is immobilized with respect to the bearing element 62 by means of a braking device 74, so that the stop may be held fast in a new position close by thanks to the action of shock absorber 58 acting as a decelerator device 75. This is frequently necessary if a long stroke of the shock absorber is needed in view of the great weight and speed of the intermediate carrier displaced and if small components are thereupon to be placed or machined in areas displaced by short distances only. Instead of forming device 63 by cogged belt 65 and pulleys 66, it is evidently also possible to make use of rack and pinion system 70, 71 in conjunction with motor 72. Devices 63 which are analogous or also differently constructed—as shown diagrammatically only—may correspondingly be incorporated to establish the position of intermediate carrier 49 with respect to intermediate carrier 50.

A shock absorber 43 is provided in a terminal portion of guide track 10 so that a smooth interruption and limitation of the travel are available upon moving intermediate carrier 50 into this terminal position.

As more clearly apparent from FIG. 3, the braking device 60 comprises brake calipers which are moved towards each other and clamped fast on guide post 59 by means of a drive. It is evidently also possible to construct the braking device in any other form and manner. The limitation of the inward pressing motion of tool 46 occurs by means of fixed stop 76, but it is also possible within the scope of the invention to monitor and control the longitudinal feed of tool 46 in the same manner as described for intermediate carriers 49, 50.

A system for handling components 78 is illustrated in FIG. 4, wherein several gripper devices 80 to 82 are separately displaceable and adjustable on a common guide track 79. Each of these gripper devices 80, 81, 82 is connected to its own displacing drive 83, 84, 85. For positioning with dimensional precision of the intermediate carriers 87 and 88 of the separate gripper devices 80 to 82 guides on the guide posts 86, braking devices 89, 90 are allocated to them in each case. Displacing drives 91 are incorporated for displacing the intermediate carriers 88. A position detector device 93 is situated in the bearing body 92 or in a bracing plate 19 of the same, to determine the position or setting of the separate gripper devices 80 to 82 along guide track 79. The position of separate gripper devices 80 to 82 is scanned by pickup heads 94 of the capacitive measuring device 95. Fixedly installed scanner elements 96, furthermore, allow a constant comparison of the position detected by means of measuring device 95 with the actual position of gripper devices 80 to 82 along guide track 79. These scanner elements 96 may simultaneously also serve the purpose of limiting the ranges of operation of the individual gripper devices 80 to 82, so that damage caused by impingement between the individual gripper devices 80 to 82 is reliably prevented.

For monitoring the position of intermediate carriers 88, these comprise ratchet 97 at one side—as illustrated for the gripper device 82 only, to simplify illustration—which meshes with pinion 99 connected to measuring device 98. The measuring device 98 and the pinion 99 are secured on intermediate carrier 87. The limit positions of the intermediate carriers 88 may moreover be established by means of scanner or sensor elements 100 which may have allocated to them a shock absorber 43, as indicated in the case of the gripper device 81, to prevent damage upon impact between the intermediate carriers 88 and 87.

In the present embodiment, gripper devices 80 to 82, as well as the intermediate carriers allocated to them, are of analogous construction.

Intermediate carrier 101 of a system 1 for handling or positioning components or tools is illustrated in FIG. 5, which is displaceable along guide posts 102 of guide track 5 by means of a displacing drive 103 in the directions indicated by double-headed arrow 104. For precise positioning of the intermediate carrier 101 in different positions along guide track 5, the same has allocated to it a stop 105 which is effective in both directions of displacement indicated by the double-headed arrow 104. The stop 105 may be displaced together with the intermediate carrier 101 and by means of a bracket 106 or the like, along the guide track 5 formed by guide posts 102. The transmission of force during the forwardly directed displacement of the intermediate carrier occurs in each case by symmetrically arranged shock absorbers 107. Braking devices 108, which may be operated independently of each other and which are clamped fast to guide posts 102, are installed on bracket 106 of stop 105, as well as on intermediate carrier 101. Devices 109 for detecting the positions of stop 105 and of intermediate carrier 101, respectively, are incorporated for monitoring the positions of stop 105 and of intermediate carrier 101, respectively. The device 109 allocated to stop 105 comprises a circulating cogged belt 65 and the mode of operation of this system is the same as that already described in connection with device 63 according to FIGS. 2 and 3. A plunger potentiometer 110—forming device 109—of a measuring device 111 is incorpoated so that the position of stop 105 with respect to intermediate carrier 101 may be determined. In the position illustrated in the drawing, intermediate carrier 101 was displaced towards the left in the drawing by means of displacing drive 103 and arrested by means of stop 105. The positioning of the intermediate carrier occurs as follows. The stop 105 is held by the equal and opposed action of shock absorbers 107 during the displacement of the intermediate carrier 101—in the neutral position 112 indicated by dash-dotted lines. If device 109 detects that stop 105 comes close to the required limit position, this stop is decelerated by means of braking devices 108 and positioned with dimensional precision, whereupon intermediate carrier 101 is moved against the action of shock absorber 107 effective in the direction of displacement in each case, until it impinges on an adjustable fixed stop 113. A sensor element may simultaneously be situated in this fixed stop 113, by means of which the arrival of intermediate carrier 101 at the limit position is reliably indicated. A complementary check also derives from the distance indicated by plunger potentiometer 110 between stop 105 and intermediate carrier 101. The intermediate carrier 101 may then be clamped fast by means of its braking devices 108 with respect to the guide posts 102, whereupon it is possible to release braking devices 108 on bracket 106 and to displace these thereupon into central position 112 shown by dash-dotted lines by the action of shock absorber 107 compressed during the braking operation.

If a comparatively small displacement of intermediate carrier 101 is then desirable, which is smaller than twice the stroke of shock absorbers 107 placed between stop 105 and intermediate carrier 101, following a displacement performed through a greater range, intermediate stops 115 may be placed between support elements 116 on intermediate carrier 101 and fixed stops 113 by means of drives 114. If these intermediate stops 115 are adjustably installed on the carriers receiving them, it is possible to reach an optional number of positions between the two support elements 116 of intermediate carrier 101. It is evidently also possible to install more than the intermediate stops 115 illustrated, or a stop steplessly displaceable in a servo-motor.

It is evidently also possible furthermore for the momentary position of stop 105 to be detected by device 109 during the release of shock absorber 107 and the return displacement of stop 105 into central position 112, and for the same to be stopped by means of its braking devices 108 at an intermediate position between the setting shown by solid lines and central position 112 shown by dash-dotted lines.

The structure of system 1 according to the invention and FIG. 5 may be modified within the scope of the prior art, in which connection it is essential merely that intermediate carrier 101 as well as stop 105 should have available separate braking devices 108, so that stop 105 may assume a neutral central position or a position spaced apart from the intermediate carrier while intermediate carrier 101 is immobilized in the required position, so that it may describe the deceleration path required for smooth deceleration of shock absorber 107 during the next displacing operation.

As apparent furthermore from FIG. 5, a control device 130 comprises two brake control elements 117 acted upon independently of each other, of which one is allocated to braking device 108 arranged on stop 105 or on its bracket 106, and the other—connected to a program emitter 119 by time-delay element 118—is allocated to braking device 108 arranged on intermediate carrier 101. As indicated, the two brake control elements 117 are connected to position detecting device 109 so that the action of braking devices 108 may be controlled commensurately as a function of the distance between stop 105 or intermediate carrier 101 and the required position. To this end, an adjustable drive 120, e.g. a servo-valve 121, may be installed between brake control element 117 and braking device 108. Separate action on the separate braking devices allows separate positioning and immobilizing of intermediate carriers and stops co-ordinated with each other. The braking device of the intermediate carrier may thus act as a decelerator device upon impinging against the stop, whereas after precise positioning, the position of the intermediate carrier is fixed with respect to the guide track. During this period, the braking device of the stop may already have been released to carry the stop to another initial position with respect to the intermediate carrier or to relieve damping devices arranged on the stop or on the intermediate carrier.

If intermediate stops, which may be infinitely adjustable, or displaceable fixed stops are installed between the stop and intermediate carrier, which may, if need be, be moved to a setting situated between the stop and intermediate carrier, a precisely presettable positioning action is also possible within the extension of the damping travel of decelerator means between stops and intermediate carriers.

A system 122 for handling or positioning components 2 or tools is illustrated in FIG. 6. This system 122 comprises guide track 123 formed by two guide posts 124. The guide posts 124 are affixed to bearing plates 126, 127 which form the torsionally rigid bearing body 125 together with bearing beams 129, 128. As shown in the present embodiment, the bracing plate 129 may be formed by a cylinder-piston system 130 which at the same time forms a displacing device 131 for intermediate carrier 133 displaceable in a longitudinal direction—shown by an arrow 132—of guide track 123. A positioning device 134 formed by a rotary element 135 whereof the surface has stops 136 situated on it, is also installed in the bearing element 125. The rotary element 135 is rotatable around pivot spindle 138 by means of a rotary drive formed by stepping motor 137.

As apparent, furthermore, guide posts 124 are situated in a plane 140 extending obliquely with respect to a vertical plane 139—shown by broken lines—extending centrally between them. The planes preferably subtend an angle 141 of, say, 45°. If the rotary element 135 of the positioning system 134 and the displacing device 131 are symmetrically situated with respect to vertical plane 139 and the guide posts 124, a spatial framework is formed between the two bearing plates 126. This spatial framework is complementarily reinforced by bracing plate 128. A rigid mounting of the guide posts 124, affected but little by torsion, and a very precise guiding action for intermediate carrier 133 are obtained thereby. The intermediate carrier 133 is equipped, for example, with two mutually perpendicularly extending reference surfaces 142 which serve the purpose of installing components or tools, such as a suction gripper 143, in the illustrated embodiment. To allow for uncomplicated assembling, these reference surfaces 142 may be equipped with assembling bores 144 or centering bores 145 so that the components or tools like the suction gripper 143 may be aligned and installed in register.

Bracing plate 128 may also be equipped with corresponding assembling bores and centering bores 144 and 145, so that bearing body 125 or the handling or positioning system also referred to as a linear axis may—for utilization in a horizontal or vertical plane—be mounted on a pedestal 146 or on an intermediate carrier of another system according to the invention.

It is advantageous for a bracing beam of the torsionally rigid bearing element to be formed by the cylinder casing of a cylinder-piston system since the physical properties of the displacing drive for the intermediate carrier or the gripper element may thereby complementarily be used to absorb stresses during the displacement and deceleration of the intermediate carrier.

It is also possible, moreover, for the bracing beams of the bearing element to be formed by at least one of the two guide columns and/or by a bracing plate extending parallel thereto, and/or a cylinder casing. Substantially the same physical properties are produced in the horizontal as well as vertical directions and the handling system may be constructed in rigid and oscillation-free manner, so that intermediate carriers may be decelerated and positioned precisely, even with eccentric loads.

According to the invention, it is also possible moreover for a cylinder casing of the displacing device and a positioning device for the intermediate carrier to be arranged symmetrically to the guide columns with respect to a vertical plane extending centrally between these, whereby it is possible to produce a compact structural unit of, say, square or rectangular cross-section.

If the positioning device comprises a rotary element having a pivot spindle extending parallel to the guide posts, whereof the peripheral surface has arranged on it several, preferably, exchangeable stops, it is possible to perform a stop-related positioning operation for predetermined settings throughout the guiding length of the intermediate carrier.

It is shown in FIG. 7 that displacing device 131 and positioning device 134 are situated in two planes 140 extending symmetrically with respect to the vertical plane 139, so that the system 122 may be constructed in extremely compact form, with a square or rectangular cross-section throughout. It is also apparent from this illustration that the rotary element 135 has circular grooves 147 at the periphery, for example, in which stops 136 may be installed at the required distances from the bearing plates 126, 127. Abutment 149 displaceable in a longitudinal guide 148, e.g. a dovetail guideway, in the longitudinal direction of the guiding track—arrow 132, FIG. 6—and which may be formed by two elements displaceable with respect to each other for fine adjustment during co-operation with stops 136, is coordinated with stops 136.

Shock absorbers 150 are situated between abutment 149 on the intermediate carrier 133 and stops 136, to prevent jolts upon impingement of abutment 149 on the stops 136.

If the stops are installed on the peripheral surface in different radial areas and at different distances in the direction of the axis of rotation, a reliable and unobstructed positioning operation may be obtained even in the case of short displacing movements of the intermediate carrier merely by twisting the rotary element through a few degrees of angle, thanks to the successive stops being staggered in the radial direction of the rotary element. Furthermore, it is also advantageous for these stops to be situated along a helix on the surface of the rotary element, since a continued operation of the intermediate carriers may thereby be obtained by means of short pivotal displacements.

If the rotary element is coupled to a rotary drive, e.g. a stepping motor or a ratchet mechanism, rapid and uncomplicated displacement or setting of the stops situated on the rotary element is obtainable.

It is also possible, moreover, for several rotary elements to be installed one behind another in the longitudinal direction of the guide posts so that mutally independently displaceable stops may be allocated to different sections of the guide track of the intermediate carrier and a locating action establishing the position defining the next setting of the intermediate carrier may be performed without deleteriously affecting the setting of the intermediate carrier at the previous position.

It is also advantageous for the stops on the rotary elements to have allocated to them a stop element on the intermediate carrier, and for a shock absorber to be preferentially installed between the stops and the stop element or the intermediate carrier, since a smooth and even stopping of the intermediate carrier at the different stop positions along the rotary element and notwithstanding its direction of motion is assured thereby.

It is apparent from FIG. 8 that shock absorbers 150 are allocated to the stop element 149 in both directions of the intermediate carrier 133 denoted by the arrow 132. In contrast to FIG. 6, positioning device 134 is formed by two rotary elements 135, 151 displaceable separately. In contrast to rotary element 135, rotary element 151 is turned with respect to pivot axis 138 by means of a ratchet mechanism 152 instead of a stepping motor. The ratchet wheel of the ratchet mechanism 152 may have allocated to it a sensor element 153 whereby the traversal through a zero position is determined in each case. It is also possible, however, for each pawl to have allocated to it several adjacently situated coding fins which co-operate with several adjacently positioned sensor elements. Depending on the pattern of the sensor fins, each pawl may have a number allocated to it, for example in binary code, so that the position of rotary element 151 may be scanned and detected at any time.

Sensor elements 153 are analogously allocated to stop element 149 at its limit positions, for example set by means of shock absorbers 150, so that arrival at the appropriate, precise and stop-limited position may be reported to a control device.

The connection between displacing device 131 or a cylinder-piston system 130 lacking a piston rod, and intermediate carrier 133 is established by means of an entraining plate 154 situated on intermediate carrier 133, wherein engages an entraining block 155 of the cylinder-piston system 130. The connection between the entraining plate 154 and the entraining block 155 should have as little play as possible. It is unnecessary, however, to equip the same with precisely machined fitting surfaces since the displacement of intermediate carrier 133 is interrupted precisely by stops 136. The incorporation of two separate rotary elements 135 and 151 allows one of the stops 136 of the rotary element 135 to be placed in a position determining the next position of intermediate carrier 133, in a limit position of intermediate carrier 133 defined by a stop 156 of rotary element 151. Such a position is illustrated by dash-dotted lines in the right-hand part of FIG. 8. Apart from this, the intermediate carrier may also be carried into the limit positions, as shown by broken lines in the left-hand part of FIG. 8.

It is also apparent that in the case of the rotary element 135, the stops are displaceably installed in grooves 157 encircling the surface of the rotary element 135, and the stops 156 in grooves 158 extending parallel to the pivot spindle 138. The stops 135 and 156 may, for example, be secured by bonding, or bolted or clamped joints, or the like.

What is claimed is:

1. An apparatus for handling a structural part or tool, which comprises
    (a) a displaceable intermediate carrier for the structural part or tool,
    (b) a torsionally rigid bearing body for the intermediate carrier, the bearing body comprising
        (1) a guide track having respective terminal portions and being constituted by two fixed guide posts displaceably supporting the intermediate carrier and being arranged symmetrically with respect to a plane of symmetry passing through the intermediate carrier and being parallel to the guide track, the two guide posts definining a plane extending diagonally with respect to the plane of symmetry,
        (2) bearing plates for the guide posts at the terminal portions of the guide track, the structural part or tool being disposed between the bearing plates,
        (3) a bracing beam constituted by a cylinder casing of a cylinder-piston device, said cylinder casing connecting the bearing plates and extending parallel to the guide track offset from the diagonally extending plane, and
        (4) a bracing plate connecting the bearing plates at respective ends thereof and extending parallel to the guide track to form a rectangular frame with the bearing plates, the bracing beam and plate forming a torsionally rigid bearing body with the bearing plates,
    (c) a displacing device coupled to the intermediate carrier and the piston of said cylinder-piston device for displacing the intermediate carrier along the guide track between the bearing plates, and
    (d) a device for positioning the intermediate carrier along the guide track.

2. The apparatus of claim 1, wherein the displacing device comprises a cylinder-piston device in a cylinder casing, the cylinder casing and the positioning device being arranged approximately symmetrically with respect to the plane of symmetry.

3. The apparatus of claim 1, wherein the positioning device comprises a rotary body having a periphery and a rotary axis extending parallel to the guide posts and a plurality of stops spaced about the periphery of the rotary body.

4. The apparatus of claim 3, wherein the stops are exchangeably arranged on the periphery of the rotary body.

5. The apparatus of claim 3, wherein the stops are arranged on the periphery of the rotary body in different radial portions and at different distances from the rotary axis.

6. The apparatus of claim 3, further comprising a drive for rotating the rotary body.

7. The apparatus of claim 6, wherein the rotating drive is a stepping motor.

8. The apparatus of claim 3, further comprising an abutment arranged on the intermediate carrier for cooperation with the stops on the rotary body.

9. The apparatus of claim 8, further comprising a shock absorber arranged between the stops on the rotary body and the abutment on the intermediate carrier.

10. The apparatus of claim 1, further comprising a respective stop at both sides of the intermediate carrier.

* * * * *

UNITED STATES PATENT AND TRADEMARK OFFICE
CERTIFICATE OF CORRECTION

PATENT NO. : 4,666,367
DATED : MAY 19, 1987
INVENTOR(S) : WALTER STICHT

It is certified that error appears in the above-identified patent and that said Letters Patent are hereby corrected as shown below:

Cover page, item [30], priority data should be --Jun. 28, 1983 [AT] Austria.............2354/83--.

Signed and Sealed this

Third Day of November, 1987

Attest:

DONALD J. QUIGG

Attesting Officer

Commissioner of Patents and Trademarks